(12) United States Patent
Doi

(10) Patent No.: US 9,774,762 B2
(45) Date of Patent: Sep. 26, 2017

(54) IMAGE PROCESSING APPARATUS, IMAGE FORMING APPARATUS AND IMAGE PROCESSING METHOD

(71) Applicant: Oki Data Corporation, Tokyo (JP)

(72) Inventor: Toshihiro Doi, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 15/074,394

(22) Filed: Mar. 18, 2016

(65) Prior Publication Data

US 2016/0330348 A1 Nov. 10, 2016

(30) Foreign Application Priority Data

Apr. 30, 2015 (JP) ................. 2015-092701

(51) Int. Cl.
*H04N 1/04* (2006.01)
*H04N 1/60* (2006.01)
*H04N 1/024* (2006.01)
*H04N 1/46* (2006.01)
*H04N 1/56* (2006.01)
*H04N 1/40* (2006.01)

(52) U.S. Cl.
CPC ............ *H04N 1/60* (2013.01); *H04N 1/024* (2013.01); *H04N 1/40012* (2013.01); *H04N 1/46* (2013.01); *H04N 1/56* (2013.01); *H04N 2201/0091* (2013.01)

(58) Field of Classification Search
CPC H04N 1/60; H04N 1/024; H04N 1/46; H04N 1/56; H04N 1/40012
USPC ........................ 358/1.15, 1.13, 1.9
See application file for complete search history.

(56) References Cited

U.S. PATENT DOCUMENTS

| 7,508,552 | B2 * | 3/2009 | Touura | H04N 1/40062 345/168 |
| 2009/0219558 | A1 * | 9/2009 | Murakami | H04N 1/387 358/1.13 |
| 2011/0043874 | A1 * | 2/2011 | Saika | H04N 1/0071 358/475 |
| 2011/0261424 | A1 * | 10/2011 | Matsuoka | H04N 1/40 358/505 |

FOREIGN PATENT DOCUMENTS

JP H06-276368 A 9/1994

\* cited by examiner

*Primary Examiner* — Houshang Safaipour
(74) *Attorney, Agent, or Firm* — Rabin & Berdo, P.C.

(57) ABSTRACT

An image processing apparatus includes a receiving unit, a generating unit, and a determining unit. The receiving unit receives first image data. The first image data includes a first part corresponding to a manuscript and a second part corresponding to a non-manuscript. The generating unit generates second image data by processing the second part. The determining unit determines whether the manuscript is processed as a monochromatic image or a color image, based on the second image data. The determining unit outputs a result of the determination.

6 Claims, 8 Drawing Sheets

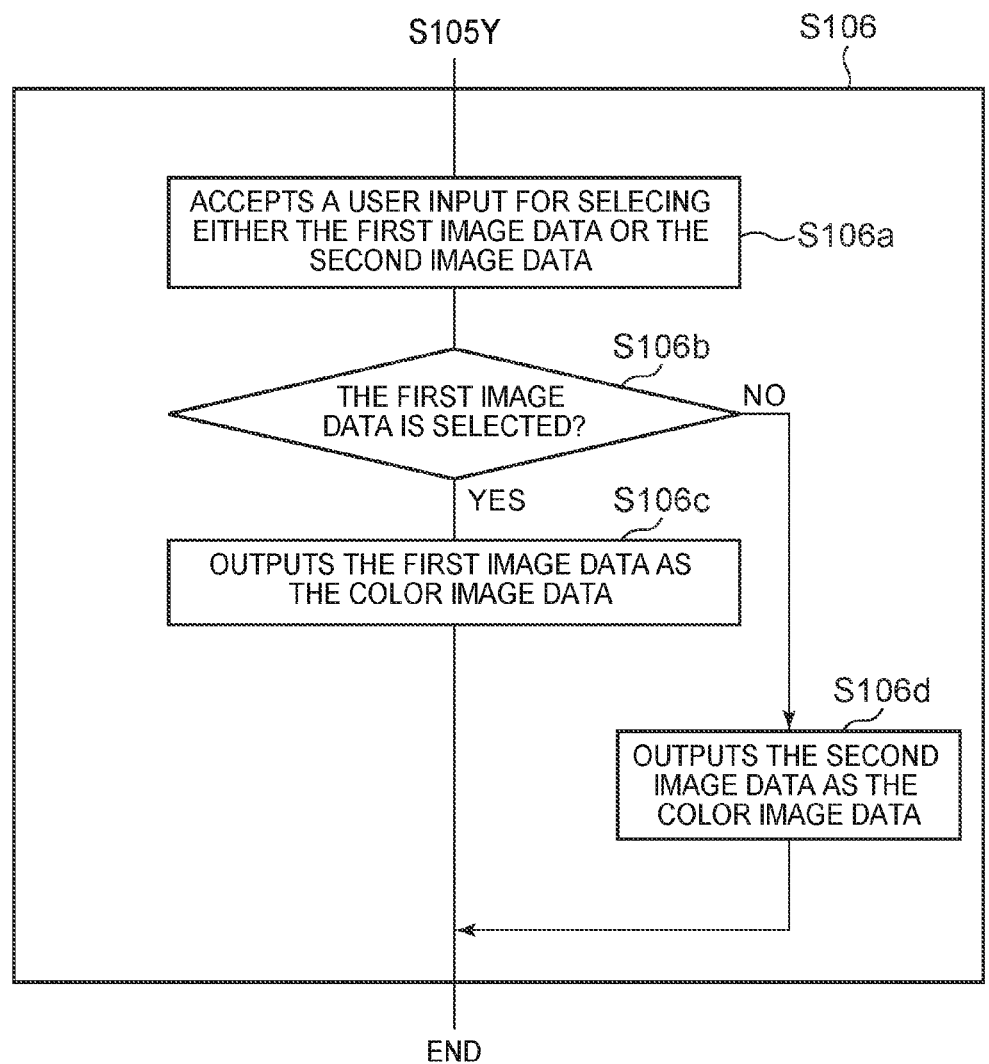

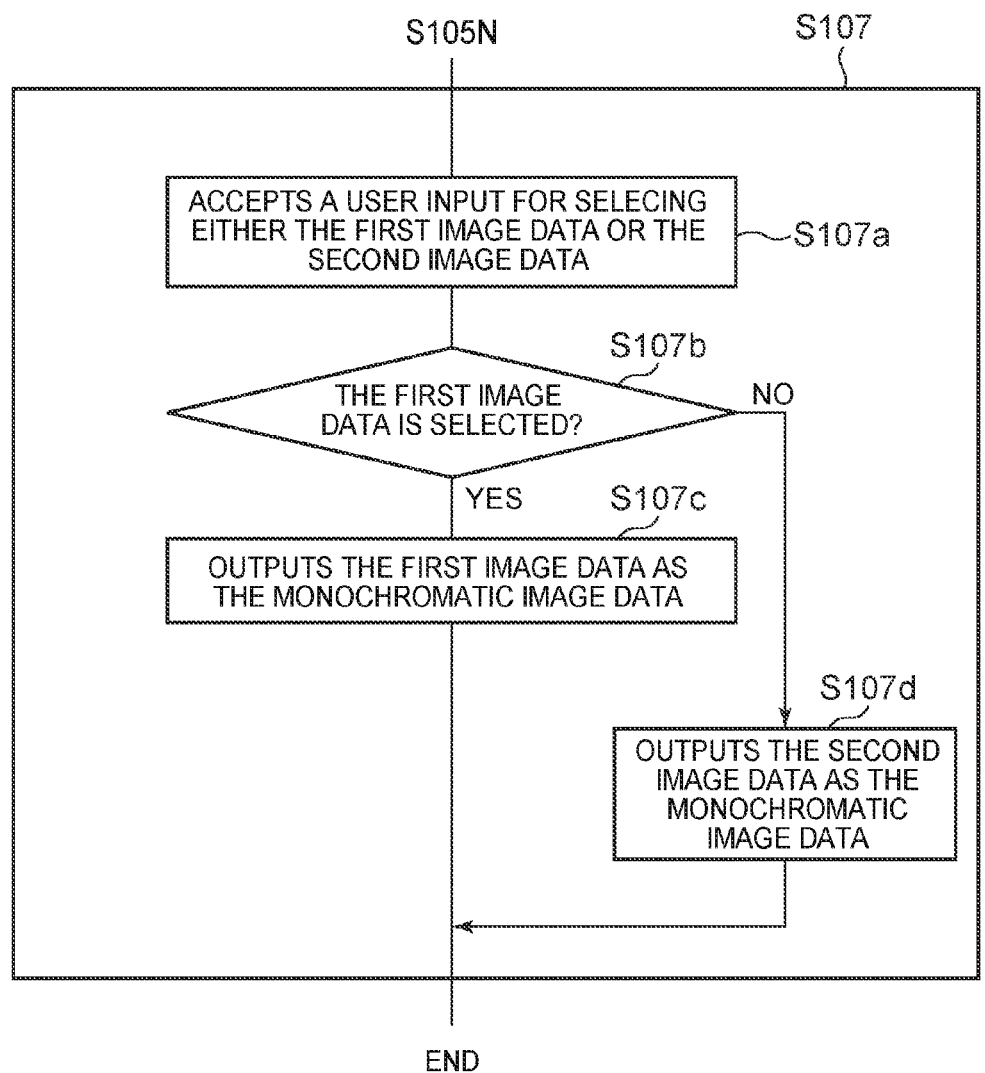

IMAGE PROCESSING APPARATUS, IMAGE FORMING APPARATUS AND IMAGE PROCESSING METHOD

CROSS REFERENCE TO RELATED APPLICATIONS

This application claims priority based on 35 USC 119 from prior Japanese Patent Application No. 2015-092701 filed on Apr. 30, 2015, the entire contents of which are incorporated herein by reference.

BACKGROUND OF THE INVENTION

1. Field of the Invention

This application relates to an image processing apparatus, an image forming apparatus and an image processing method.

2. Description of Related Art

A conventional image forming apparatus irradiates a manuscript which is placed on a transparent manuscript platen with light. The apparatus has a light receiving element that receives reflected light from the manuscript. The apparatus receives image data corresponding to the manuscript, based on the reflected light (see, for example, Japanese Laid-open Patent Publication No. 06-276368).

However, if the conventional image forming apparatus scans a monochromatic manuscript while a manuscript platen cover attached for covering the transparent manuscript platen and the manuscript is open, light from the outside incident to a portion of the transparent manuscript platen not covered by the manuscript causes a false detection that the monochromatic manuscript as a color manuscript.

SUMMARY OF THE INVENTION

According to one aspect of an invention disclosed herein, an image processing apparatus includes a receiving unit, a generating unit, and a determining unit. The receiving unit receives first image data. The first image data includes a first part corresponding to a manuscript and a second part corresponding to a non-manuscript. The generating unit generates second image data by processing the second part. The determining unit determines whether the manuscript is processed as a monochromatic image or a color image, based on the second image data. The determining unit outputs a result of the determination.

According to another aspect of the invention, an image forming apparatus includes a reading unit, a generating unit, a determining unit, an output unit, and an image forming unit. The reading unit reads a manuscript. The reading unit generates first image data. The first image data includes a first part corresponding to the manuscript and a second part corresponding to a non-manuscript. The generating unit generates second image data by processing the second part. The determining unit determines whether the manuscript is processed as a monochromatic image or a color image, based on the second image data. The determining unit outputs a result of the determination. The output unit outputs the manuscript as the monochromatic image if the determining unit determines that the manuscript is processed as the monochromatic image. The output unit outputs the manuscript as the color image if the determining unit determines that the manuscript is processed as the color image. The image forming unit forms the monochromatic image on a sheet. The image forming unit forms the color image on a sheet.

According to another aspect of the invention, an image processing method includes receiving first image data, the first image data includes a first part corresponding to a manuscript and a second part corresponding to a non-manuscript, generating second image data by processing the second part, determining whether the manuscript is processed as a monochromatic image or a color image, based on the second image data, and outputting a result of the determination.

According to this invention, an apparatus can determine whether the manuscript is processed as a monochromatic image or a color image more accurately.

BRIEF DESCRIPTION OF THE DRAWINGS

In the attached drawings:

FIG. 8 is a flowchart showing processing executed by the scanner according to the modification; and FIG. 9 is a flowchart showing processing executed by the scanner according to the modification.

DETAILED DESCRIPTION OF EMBODIMENTS

Hereinafter, preferred embodiments of the invention will be described with reference to the attached drawings.

1. First Embodiment

1-1. Structure

1-1-1. Copying Apparatus

Figure 1:
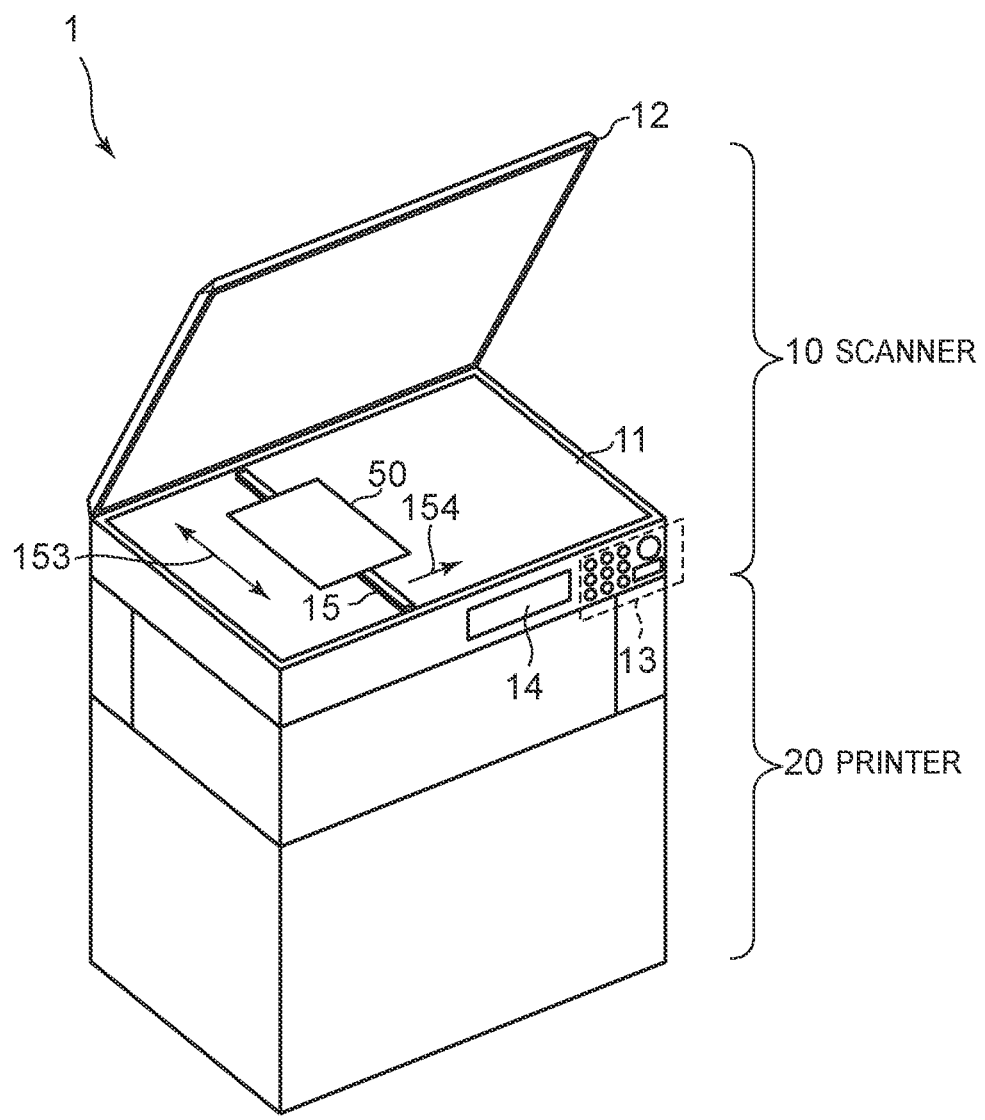
FIG. 1 is a schematic view showing a copying apparatus.

FIG. 1 is a schematic view showing a copy apparatus 1. As shown in FIG. 1, the copy apparatus 1 may include a scanner 10 and a printer 20. The copy apparatus 1 reads a manuscript 50 and receives image data by using the scanner 10. The copy apparatus 1 forms an image of the manuscript 50 on a sheet based on the image data by using the printer 20. Or the copy apparatus 1 transmits the image data to an external apparatus 22 (see, FIG. 2). The scanner 10 is one example of an image processing apparatus. The copy apparatus 1 is one example of an image forming apparatus.

1-1-2. Scanner

As shown in FIG. 1, the scanner 10 may include a transparent manuscript platen 11, a manuscript platen cover 12, an operation panel 13, a display 14, and reading device 15.

The transparent manuscript platen 11 is a part of the scanner 11 on which the manuscript 50 as a reading object is placed. The transparent manuscript platen 11 may include a transparent member such as a plate glass.

The manuscript platen cover 12 is attached for opening/closing to cover the transparent manuscript platen 11 and the manuscript 50. The close state of the manuscript platen cover 12 is that the manuscript platen cover 12 covers the transparent manuscript platen 11 and the manuscript 50. The open state of the manuscript platen cover 12 is that the manuscript platen cover 12 does not cover the transparent manuscript platen 11 and the manuscript 50.

The manuscript platen cover 12 in the close state, prevents light from outside from being incident on the reading device 15. On the other hand, the light from outside is incident on the reading device 15 in the open state of the manuscript platen cover 12.

The operation panel 13 accepts a user input. The display 14 displays a variety of information based on controlling by a CPU (Central Processing Unit) 33. For example, the display 14 displays information about a state of the copy apparatus 1.

Figure 3:
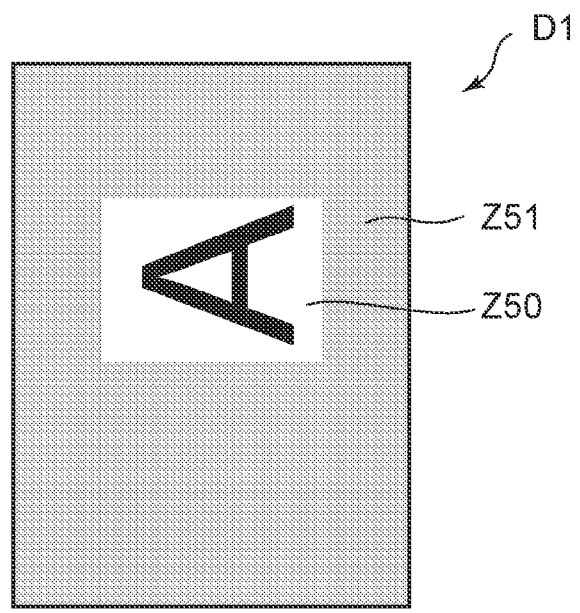
FIG. 3 is a schematic view showing a reading object image corresponding to first image data.

The reading device 15 reads the manuscript 50. Then the reading device 15 generates first image data. As shown in FIG. 3, the first image data D1 includes a first part Z50 corresponding to the manuscript 50 and a second part Z51 corresponding to a non-manuscript. The reading device 15 may include a light source to irradiate the manuscript 50 with light and a light receiving device to receive reflected light from the manuscript 50. The light receiving device may include a lens to converge the reflected light, and a light receiving element such as a charge coupled device that performs photoelectric conversion of the converged reflected light and generates voltages corresponding to a read image. The reading device 15 is extended in a sub scanning direction 153. The reading device 15 scans the manuscript 50 at a constant speed in the scanning direction 154. The reading device 15 writes the first image data D1 in the memory 31. The reading device 15 may include a receiving device 151. The receiving device 151 receives the first image data D1 from the reading device 15.

Figure 2:
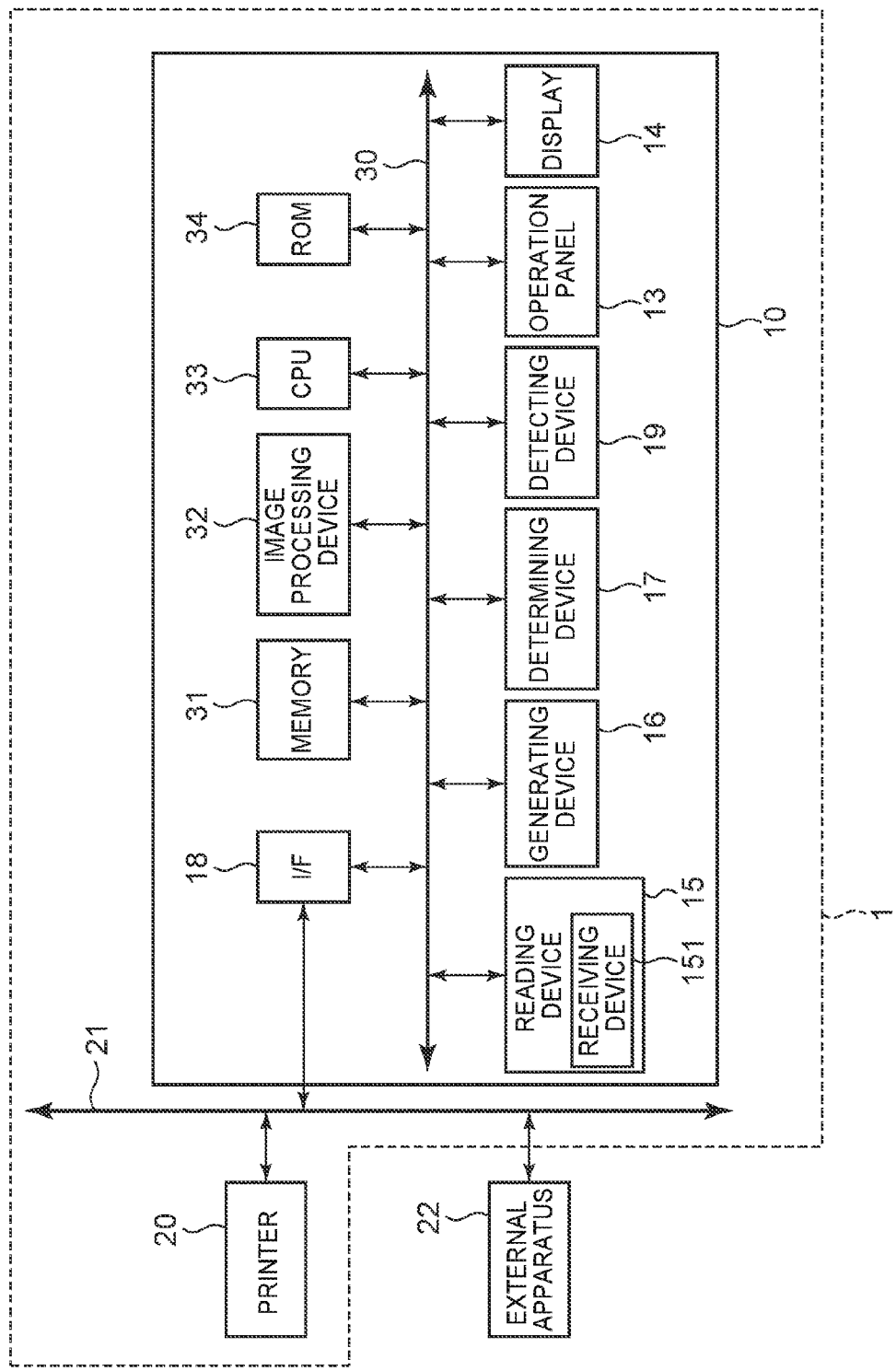
FIG. 2 is a block diagram showing a configuration of a scanner.

FIG. 2 is a block diagram showing a configuration of the scanner 10. As shown in FIG. 2, the scanner 10 may include a generating device 16, a determining device 17, an interface (an I/F) 18, a detecting device 19, a memory 31, an image processing device 32, the CPU 33, a ROM (Read Only Memory) 34, the reading device 15, the operation panel 13, and a display 14.

The generating device 16, the determining device 17, the I/F 18, the detecting device 19, the memory 31, the image processing device 32, the CPU 33, the ROM 34, the reading device 15, the operation panel 13, and a display 14 are interconnected by a bus 30. The scanner 10 is connected to the printer 20 through a bus 21. The scanner 10 may be connected to the external apparatus 22 through the bus 21.

The generating device 16 detects the second part Z51 corresponding to the non-manuscript. The generating device 16 processes the second part Z51. As a result, the generating device 16 generates a second image data D2 (see FIG. 4).

Figure 4:
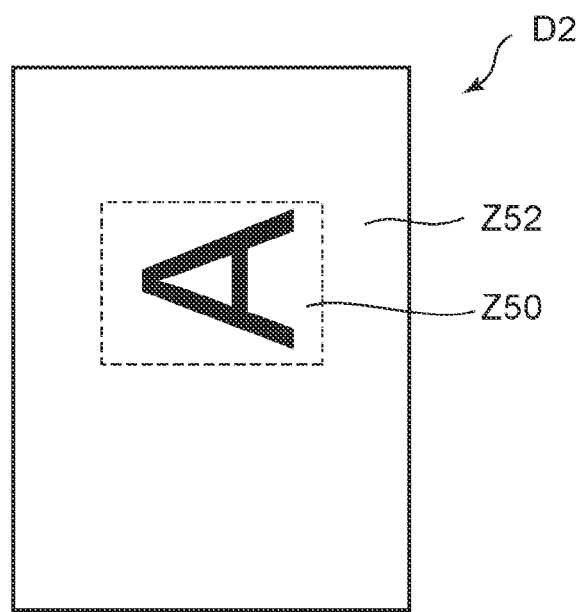
FIG. 4 is a schematic view showing an image corresponding to second image data.

When the thickness of the manuscript 50 is large, for example, the manuscript 50 is a book, the reading device 13 reads the manuscript 50 in the state that the manuscript platen cover 12 is open. In this case, as shown in FIG. 3, the second part Z51 corresponding to the non-manuscript is blackish. Therefore, the generating device 16 deletes the second part Z51. Or, as shown in FIG. 4, the generating unit 16 changes the second part Z51 into monochromatic image data Z52 such as white image data and black image data. As a result, the generating device 16 generates the second image data D2. Then the generating device 16 outputs the second image data D2 to the determining device 17.

The determining device 17 determines whether the manuscript 50 is processed as a monochromatic image or a color image based on the second image data D2. The second image data D2 is easy to be determined as the monochromatic image than the first image data D1 by the determining device 17.

The determining device 17 detects a color value of each color in each pixel in the second image data D2. Specifically, the determining device 17 detects a "R" color value XR, a "G" color value XG, and a "B" color value XB. All color values are in the range of 0 to 255. The determining device 17 calculates the difference value between the "R" color value XR and the "G" color value XG. The determining device 17 calculates the difference value between the "G" color value XG and the "B" color value XB. The determining device 17 calculates the difference value between the "B" color value XB and the "R" color value XR. The determining device 17 compares the each difference with each threshold value stored in ROM 34 beforehand. Specifically, when a particular pixel satisfies the following conditional expressions (1), (2) and (3), the determining device 17 determines that the particular pixel is a color pixel. TH1 is a threshold value for the difference value between the "R" color value XR and the "G" color value XG. TH2 is a threshold value for the difference value between the "G" color value XG and the "B" color value XB. TH3 is a threshold value for the difference value between the "B" color value XB and the "R" color value XR.

$$|XR-XG|>TH1 \quad (1),$$

$$|XG-XB|>TH2 \quad (2), \text{ and}$$

$$|XB-XR|>TH3 \quad (3)$$

Furthermore, the determining device 17 calculates the number of the color pixel in the second image data D2. Namely, the determining device 17 calculates "XT". The determining device 17 compares "XT" with a threshold value TH4. When the following conditional expression (4) is satisfied, the determining device 17 determines that the manuscript 50 is processed as the color image. When the following conditional expression (5) is satisfied, the determining device 17 determines that the manuscript 50 is processed as the monochromatic image.

$$XT \geq TH4 \quad (4)$$

$$XT < TH4 \quad (5)$$

When the determining device 17 determines that the manuscript 50 is processed as the monochromatic image, the I/F 18 executes output processing for outputting the second image data D2 as monochromatic image data. When the determining device 17 determines that the manuscript 50 is processed as the color image, the I/F 18 executes output processing for outputting the second image data D2 as color image data. The I/F 18 transmits data to the printer 20 and the external apparatus 22 through the bus 21. The I/F 18 receives data from the printer 20 and the external apparatus 22 through the bus 21. The I/F 18 is one example of an output unit.

The detecting device 19 is a sensor that detects an open/close state of the manuscript platen cover 12.

The memory 31 is a readable and writable volatile memory. The memory 31 stores various data. For example, the memory 31 stores the first image data D1 and the second image data D2 temporarily.

The image processing device 32 executes image processing such as shading correction, gamma correction, and compression, of the first image data D1 and the second image data D2.

The ROM 34 is a read only non-volatile memory. The ROM 34 stores a program and data for controlling the scanner 10.

The CPU 33 controls the entire scanner 10 based on the program and data stored in the ROM 34 and the user input accepted by the operation panel 13.

1-2. Processing

Next, processing executed by the copy apparatus 1 is explained.

1-2-1. Scanner

Figure 5:
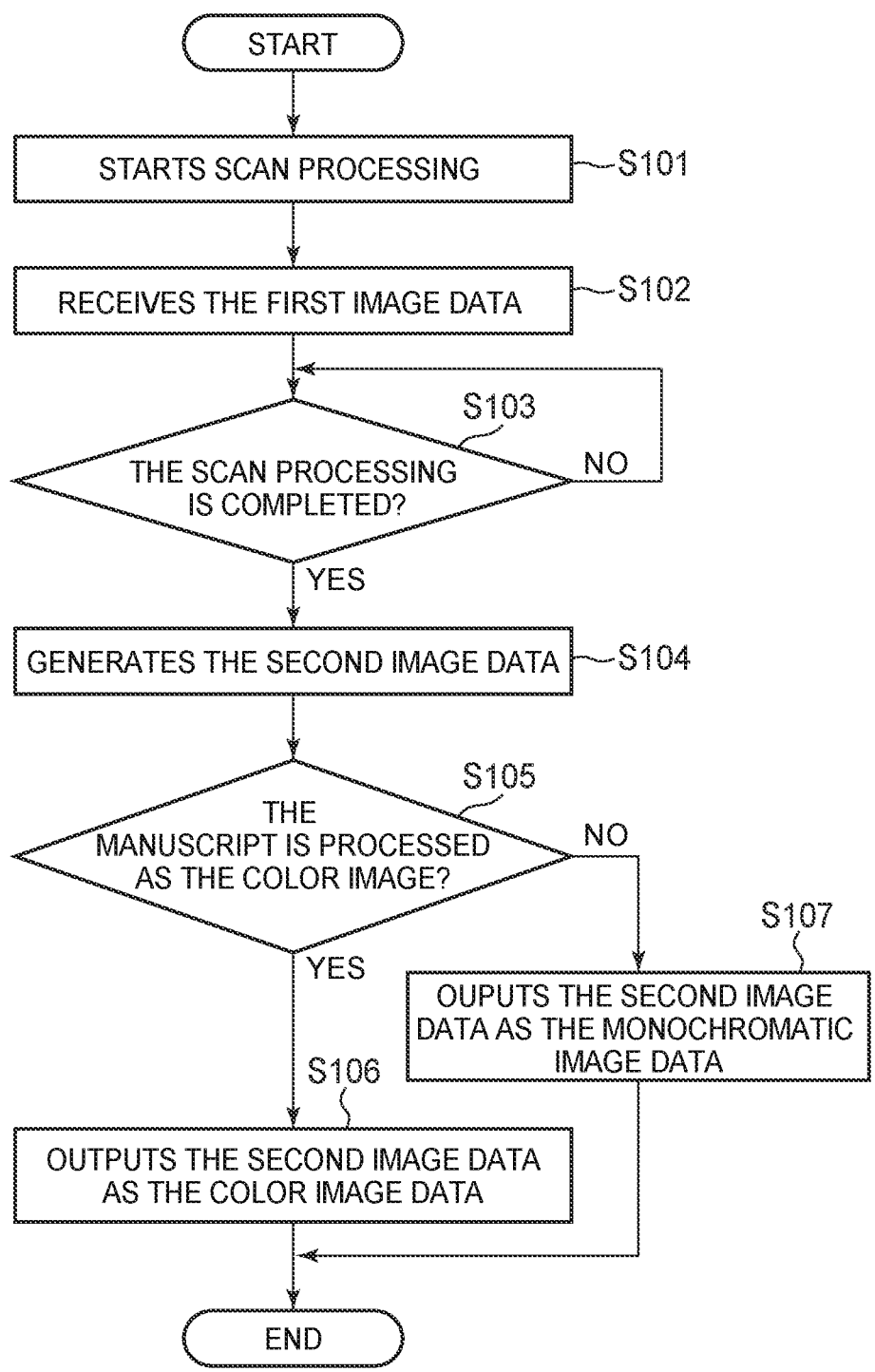
FIG. 5 is a flowchart showing processing executed by the scanner according to the first embodiment.

FIG. 5 is a flowchart showing processing executed by the scanner 10.

First, the manuscript 50 is placed on the transparent manuscript platen 11 by a user. Then the operation panel 13 accepts a user input for scanning. The CPU 33 starts scan processing based on the user input (step S101).

The reading device 15 reads the manuscript 50 upon receipt of an instruction signal from the CPU 33. The receiving device 151 receives the first image data D1 (step S102).

While the reading device 15 scans the manuscript 50 at constant speed in the scanning direction 154, the reading unit 15 irradiates the manuscript 50 with light by using light source and receives reflected light from the manuscript 50 by using the light receiving device. The reading device 15 writes the first image data D1 in the memory 31. The CPU 33 controls the display 14 to display information indicating that the scanner 10 is during reading.

Next, the CPU 33 determines whether the scan processing is completed (step S103). If the CPU 33 determines that the scan processing is not completed (step S103: NO), the CPU 33 repeats the determination of step S103 until the scan processing is completed.

If the CPU 33 determines that the scan processing is completed (step S103: YES), the generating device 16 generates the second image data D2 (step S104). Specifically, the generating device 16 analyzes the first image data D1 upon receipt of an instruction signal from the CPU 33. Then the generating device 16 detects the first part Z50 corresponding to the manuscript 50 and the second part Z51 corresponding to a non-manuscript. Then, the generating device 16 deletes the second part Z51. Or the generating device 16 changes the second part Z51 into the monochromatic image data Z52.

Next, the determining device 17 determines whether the manuscript 50 is processed as the monochromatic image or the color image, based on the second image data D2 upon receipt of an instruction signal from the CPU 33 (step S105).

If the determining device 17 determines that the manuscript 50 is processed as the color image (step S105: YES), the I/F 18 outputs the second image data D2 as the color image data (step S106). On the other hand, if the determining device 17 determines that the manuscript 50 is processed as the monochromatic image (step S105: NO), the I/F 18 converts the second image data D2 into a gray scale image data. Then the I/F 18 outputs the second image data D2 as the monochromatic image data (step S107).

The I/F 18 converts the second image data D2 into the gray scale image data based on following expressions (6).

$$Y=0.299*R+0.587*G+0.144*B \quad (6)$$

"Y" is a luminance value of each pixel included in the converted gray scale image data. "R" is a luminance value of red included in each pixel included in the second image data D2. "G" is a luminance value of green included in each pixel included in the second image data D2. "B" is a luminance value of Blue included in each pixel included in the second image data D2.

1-2-2. Printer

The printer 20 receives the color image data from the I/F 18. The printer 20 forms a color image of the manuscript 50 on the sheet based on the color image data by using toners or inks of cyan, magenta, yellow and black. The printer 20 receives the monochromatic image data from the I/F 18. The printer 20 forms a monochromatic image of the manuscript 50 on the sheet based on the monochromatic image data by using toners or inks of black.

1-3. Effect

The copy apparatus 1 deletes the second part Z51 corresponding to the non-original image part from the first image data D1. Or, the copy apparatus 1 changes the second part Z51 into the monochromatic image data Z52. As a result, the copy apparatus 1 generates the second image data D2. The copy apparatus 1 determines whether the manuscript 50 is processed as a monochromatic image or a color image, based on the second image data D2. Therefore, the influence according to the non-original image part is evaded on the determination. Namely, even if light from outside is incident to the non-original region during the scan processing, an erroneous determination by the determining device 17 is evaded.

As a result, it is evaded that the monochromatic original document is detected as a color original document by mistake. Therefore, unnecessary increase of the quantity of data is prevented. And unnecessary consumption of consumables (a color toner or a color ink) is prevented.

2. Second Embodiment

In the second embodiment, the second image data D2 is not necessarily generated. Here, a difference from the first embodiment is explained. And an explanation of the constitution same as the first embodiment is omitted.

Figure 6:
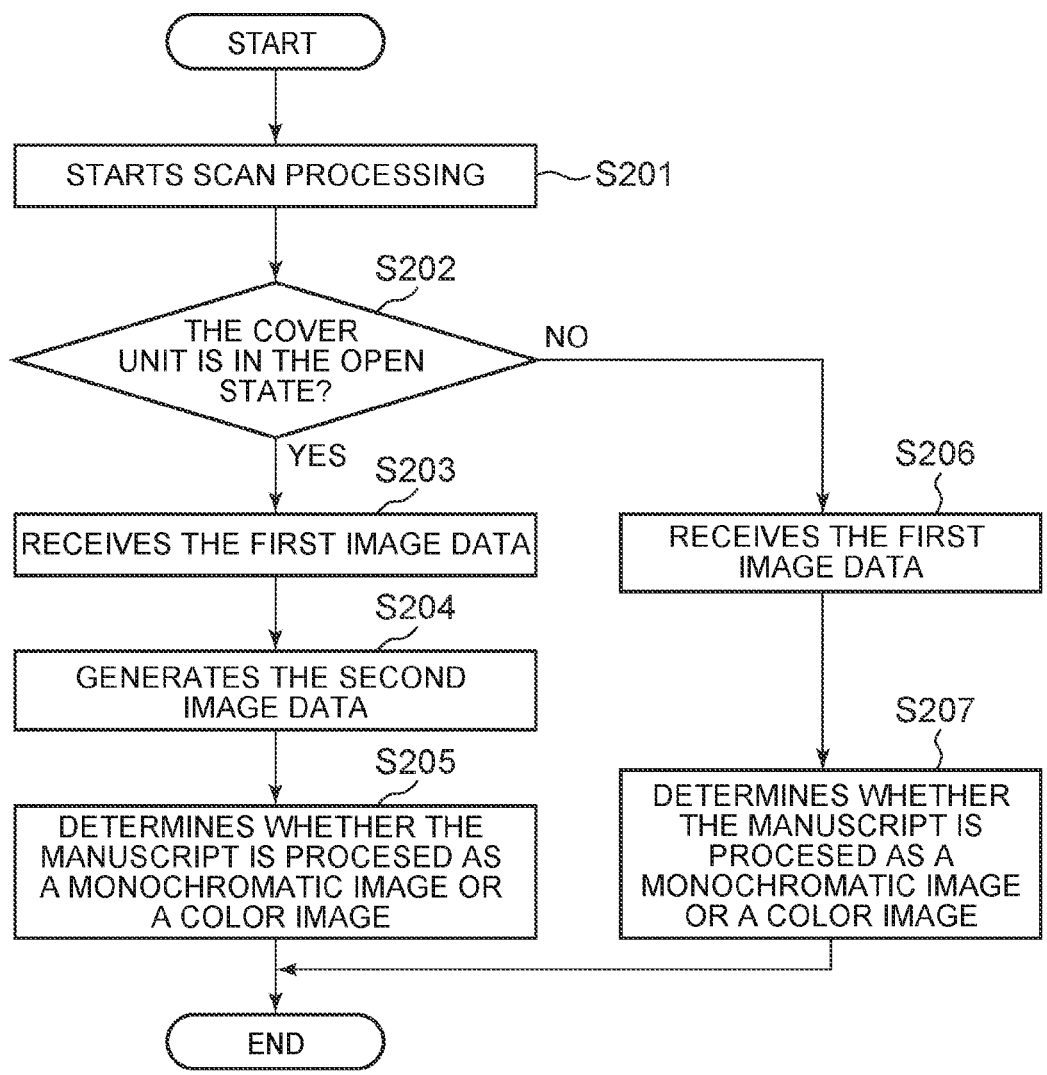
FIG. 6 is a flowchart showing processing executed by the scanner according to the second embodiment.

FIG. 6 is a flowchart showing processing executed by the scanner 10.

First, The CPU 33 starts scan processing based on the user input (step S201).

Next, the detecting device 19 detects the open/close state of the manuscript platen cover 12 upon receipt of an instruction signal from the CPU 33 (step S202).

If the detecting device 19 detects that the manuscript platen cover 12 is in the open state (step S202: YES), the receiving device 151 receives the first image data D1 (step S203). Then the generating device 16 generates the second image data D2 (step S204). Then the determining device 17 determines whether the manuscript 50 is processed as a monochromatic image or a color image, based on the second image data D2 (step S205). Then the I/F 18 executes step S106 or S107 in FIG. 5, based on a result of the determination.

On the other hand, if the detecting device 19 detects that the manuscript platen cover 12 is in the close state (step S202: NO), the receiving device 151 receives the first image data D1 (step S206). Then the determining device 17 determines whether the manuscript 50 is processed as a monochromatic image or a color image, based on the first image data D1 without the generating device 16 generating the second image data D2 (step S207). If the determining device 17 determines that the manuscript 50 is processed as the color image, the I/F 18 outputs the first image data D1 as the color image data. On the other hand, if the determining device 17 determines that the manuscript 50 is processed as a monochromatic image, the I/F 18 converts the first image data D1 into gray scale image data. Then the I/F 18 outputs the first image data D1 as the monochromatic image data.

In the second embodiment, if the manuscript platen cover 12 is in the close state, the determining device 17 determines whether the manuscript 50 is processed as a monochromatic image or a color image, based on the first image data D1 without the generating device 16 generating the second image data D2. The reason is as follow. If the manuscript platen cover 12 is in close state, light from outside is not incident to a portion of the transparent manuscript platen 11 not covered by the manuscript. Therefore, a false detection that the monochromatic manuscript as a color manuscript is not caused.

Therefore, if the manuscript platen cover 12 is in close state, the processing time can be shortened.

3. Third Embodiment

In the third embodiment, a difference from the first embodiment is explained. And an explanation of the constitution same as the first embodiment is omitted.

Figure 7:
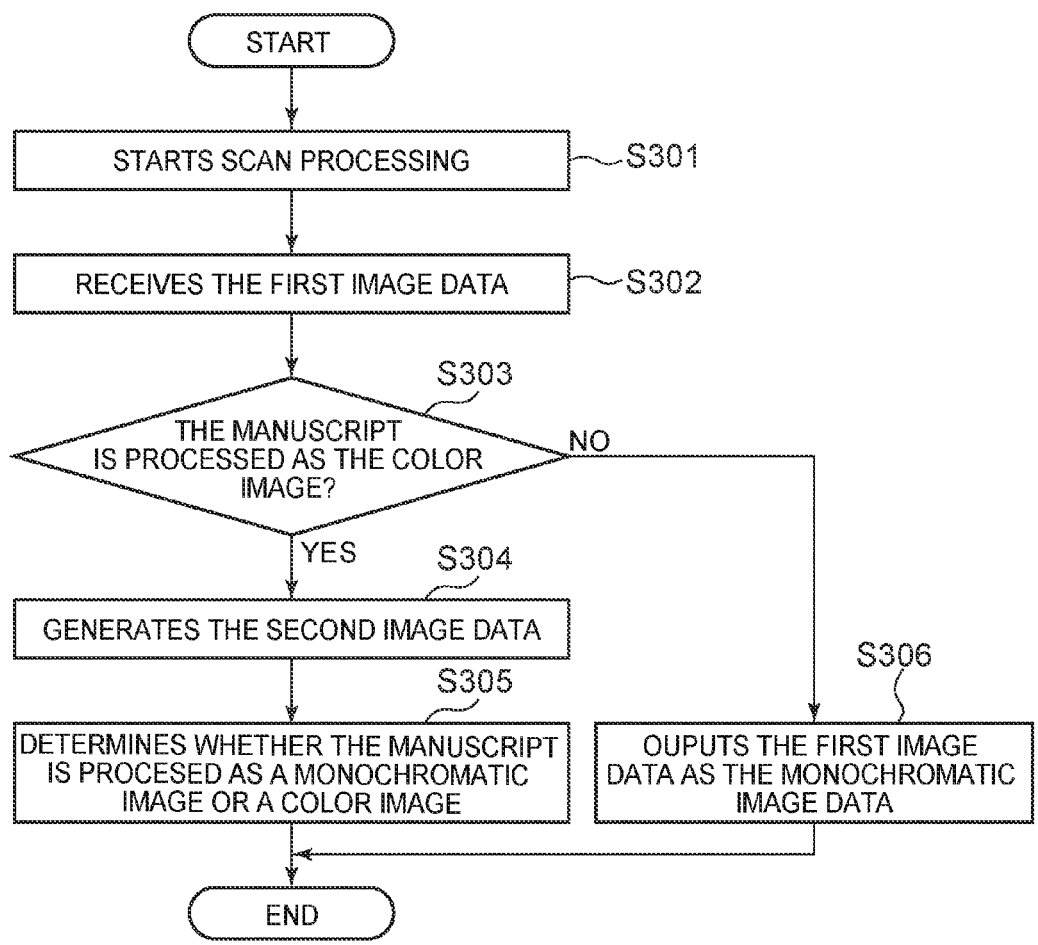
FIG. 7 is a flowchart showing processing executed by the scanner according to the third embodiment.

FIG. 7 is a flowchart showing processing executed by the scanner 10.

First, the CPU 33 starts scan processing based on the user input (step S301). Then the receiving device 151 receives the first image data D1 (step S302).

Next, the determining device 17 determines whether the manuscript 50 is processed as a monochromatic image or a color image, based on the first image data D1 (step S303).

If the determining device 17 determines that the manuscript 50 is processed as a color image (step S303: YES), the generating device 16 generates the second image data D2 (step S304). Then the determining device 17 determines whether the manuscript 50 is processed as a monochromatic image or a color image, based on the second image data D2 (step S305). Then the I/F unit 18 executes step S106 or S107 in FIG. 5, based on a result of the determination.

On the other hand, if the determining device 17 determines that the manuscript 50 is processed as a monochromatic image (step S303: NO), the I/F 18 converts the first image data D1 into a gray scale image data. Then the I/F 18 outputs the first image data D1 as the monochromatic image data without the generating device 16 generating the second image data D2 (step S306).

In the third embodiment, before the second image data D2 is generated, the determining device 17 determines whether the manuscript 50 is processed as a monochromatic image or a color image, based on the first image data D1. If the determining device 17 determines that the manuscript 50 is processed as a monochromatic image, generating the second image data D2 is omitted. Therefore, the processing time can be shortened.

4. Modification

The foregoing embodiment is that one manuscript is scanned. However, a plurality of manuscripts may be scanned at once.

In the foregoing embodiment, the generating device 16, the determining device 17, the I/F 18, the detecting device 19, the image processing device 32, the receiving device 151 may be realized by a hardware such as a circuit. The circuit includes an electric conductor as the wiring, and electronic parts. The circuit is able to amplify a signal. The circuit is able to calculate. The circuit is able to transfer data.

The generating device 16, the determining device 17, the I/F 18, the detecting device 19, the image processing device 32, the receiving device 151 may be realized by the CPU 33, RAM 31, and a software (a program) stored in the ROM 34. Specifically, the ROM 34 stores a generating program, a determining program, a I/F program, a detecting program, an image processing program, and a receiving program. The CPU 33 read these programs from the ROM 34. The CPU 33 writes these programs in the RAM 31.

A computing device is realized by the CPU 33 and the RAM 31. A non-transitory storage medium is realized ROM 34. A non-transitory storage medium may be a HDD (Hard Disk Drive).

In the foregoing embodiment, the copy apparatus 1 is one example of an image forming apparatus. The image forming apparatus may include a facsimile apparatus. The image forming apparatus may include an image displaying apparatus.

In the foregoing embodiment, if the determining device 17 determines that the manuscript 50 is processed as a monochromatic image, the I/F 18 outputs the second image data D2 as the monochromatic image data. However, even if the determining device 17 determines that the manuscript 50 is processed as a monochromatic image, the I/F 18 outputs the second image data D2 as the color image data based on setting by a user.

In the first embodiment, if the determining device 17 determines that the manuscript 50 is processed as a color image (step S105: YES), the I/F 18 outputs the second image data D2 as the color image data (step S106). However, as shown in FIG. 8, it may be determined that whether the first image data D1 or the second image data D2 is outputted as the color image data, based on the a user input accepted by operation panel 13. Specifically, if the determining device 17 determines that the manuscript 50 is processed as a color image (step S105: YES), the operation panel 13 accepts a user input for selecting either the first image data D1 or the second image data D2 (step S106a). The CPU 33 waits for accepting the user input by the operation panel 13 for the predetermined time, for example, 10 seconds. While the CPU 33 waits for accepting the user input, the display 14 may display a preview image based on the first image data D1 and a preview image based on the second image data D2. If the operation panel 13 accepts a user input indicating the first image data D1 is selected (step S106b: YES), the I/F 18 outputs the first image data D1 as the color image data (step S106c). On the other hand, if the operation panel 13 accepts a user input indicating the second image data D2 is selected, or the operation panel 13 accepts no user input for the predetermined time (step S106b: NO), the I/F 18 outputs the second image data D2 as the color image data (step S106d). If the operation panel 13 accepts no user input for the predetermined time, the I/F 18 may output the first image data D1 as the color image data.

In the first embodiment, if the determining device 17 determines that the manuscript 50 is processed as a monochromatic image (step S105: NO), the I/F 18 converts the second image data D2 into a gray scale image data. Then the I/F 18 outputs the second image data D2 as the monochromatic image data (step S107). However, as shown in FIG. 9, it may be determined that whether the first image data D1 or the second image data D2 is outputted as the color image data, based on a user input accepted by operation panel 13. Specifically, if the determining device 17 determines that the manuscript 50 is processed as a monochromatic image (step S105: NO), the operation panel 13 accepts a user input for selecting either the first image data D1 or the second image data D2 (step S107a). The CPU 33 waits for accepting the user input by the operation panel 13 for the predetermined time, for example, 10 seconds. While the CPU 33 waits for accepting the user input, the display 14 may display a preview image based on the first image data D1 and a preview image based on the second image data D2. If the operation panel 13 accepts a user input indicating the first image data D1 is selected (step S107b: YES), the I/F 18 converts the first image data D1 into a gray scale image data. Then the I/F 18 outputs the first image data D1 as the monochromatic image data (step S107c). On the other hand, if the operation panel 13 accepts a user input indicating the second image data D2 is selected, or the operation panel 13 accepts no user input for the predetermined time (step S107b: NO), the I/F 18 converts the second image data D2 into a gray scale image data. Then the I/F 18 outputs the second image data D2 as the monochromatic image data (step S107d). If the operation panel 13 accepts no user input for the predetermined time, the I/F 18 converts the first image data D1 into a gray scale image data. Then the I/F 18 may output the first image data D1 as the monochromatic image data.

In the foregoing embodiment, the generating device 16 deletes the second part Z51 corresponding to the non-manuscript. Or, the generating device 16 changes the second part Z51 into monochromatic image data Z52. However, the generating device 16 may reduce the luminance value of each pixel comprising the second part Z51.

The present invention is not limited to the foregoing embodiment but many modifications and variations are possible within the spirit and scope of the appended claims of the invention.

What is claimed is:

1. An image processing apparatus comprising:
a manuscript platen for a manuscript to be placed thereon;
a platen cover configured to open and close to cover the manuscript platen, for thereby covering the manuscript placed thereon;
a computing device; and
a non-transitory storage medium containing program instructions stored thereon, execution of which by the computing device causes the image processing apparatus to provide functions of:
a receiving unit that receives first image data, wherein the first image data includes a first part corresponding to the manuscript and a second part corresponding to a non-manuscript;
a generating unit that generates second image data by processing the second part;
a detecting unit that detects an open/close state of the platen cover;
a determining unit that determines whether the manuscript is processed as a monochromatic image or a color image
based on the second image data if the detecting unit detects the open state of the platen cover, and
based on the first image data if the detecting unit detects the close state of the platen cover,
and outputs a result of the determination; and
an output unit configured to output the manuscript as the monochromatic image if the determining unit determines that the manuscript is processed as the monochromatic image, and outputs the manuscript as the color image if the determining unit determines that the manuscript is processed as the color image.

2. The image processing apparatus according to claim 1, wherein the generating unit generates the second image data by deleting the second part.

3. The image processing apparatus according to claim 1, wherein the generating unit generates the second image data by changing the second part into monochromatic image data.

4. The image processing apparatus according to claim 1,
wherein if the determining unit determines that the manuscript is processed as the color image, based on the first image data, the determining unit determines whether the manuscript is processed as a monochromatic image or a color image, based on the second image data, and outputs a result of the determination based on the second image data;
wherein if the determining unit determines that the manuscript is processed as the monochromatic image, based on the first image data, the determining unit outputs a result of the determination based on the first image data.

5. The image processing apparatus according to claim 4,
wherein if the determining unit determines that the manuscript is processed as the color image, based on the first image data, the generating unit generates the second image data;
wherein if the determining unit determines that the manuscript is processed as the monochromatic image, based on the first image data, the generating unit does not generate the second image data.

6. The image processing apparatus according to claim 1, wherein if the detecting unit detects the open state of the platen cover, the generating unit generates the second image data;
wherein if the detecting unit detects the close state of the platen cover, the generating unit does not generate the second image data.

* * * * *